July 16, 1963 M. D. BUIVID 3,097,701
BLADE FOLDING MECHANISM
Filed Oct. 27, 1960 3 Sheets-Sheet 1

INVENTOR
MICHEL D. BUIVID
BY
AGENT

July 16, 1963
M. D. BUIVID
3,097,701
BLADE FOLDING MECHANISM
Filed Oct. 27, 1960
3 Sheets-Sheet 2

INVENTOR
MICHEL D. BUIVID
BY
AGENT

July 16, 1963 M. D. BUIVID 3,097,701
BLADE FOLDING MECHANISM
Filed Oct. 27, 1960 3 Sheets-Sheet 3

INVENTOR
MICHEL D. BUIVID
BY Jack M. McCarthy
AGENT

United States Patent Office 3,097,701
Patented July 16, 1963

3,097,701
BLADE FOLDING MECHANISM
Michel D. Buivid, Milford, Conn., assignor to United Aircraft Corporation, East Hartford, Conn., a corporation of Delaware
Filed Oct. 27, 1960, Ser. No. 65,348
14 Claims. (Cl. 170—160.12)

This invention relates to rotary-wing aircraft and particularly to a mechanism for pivotally connecting a rotor blade to a rotor head along with a means for actuating said blade so that it will pivot with respect to said rotor head.

When rotary-wing aircraft such as helicopters are used on surface ships, for example aircraft carriers, it is necessary to fold blades so that the helicopter can be carried below deck on elevators of standard size. This folding and unfolding of the rotor blades must usually be done while the ship is under way, frequently at full speed, and must be accomplished quickly.

One object of this invention is to provide an improved mechanism which can be located inside a blade mounting link. This mechanism would provide a compact actuating unit which would be located in a housing so that its operation could not be affected by other moving parts of the rotor head or other foreign bodies. This centralized location of the blade actuating mechanism reduces dynamic unbalance.

Another object of this invention is to provide a blade folding actuator which uses gear segments to provide the transmitting means between the blade and the blade actuating device. By changing the gear size of the segments, the ratio of movement between them can be changed.

A further object of this invention is to reduce the weight and size of a mechanism necessary to provide for blade folding.

Another object of this invention is to construct a blade flapping link so that a blade may be pivoted thereon with the actuating mechanism for folding being located within said flapping link.

A further object of this invention is to provide means for controlling the angle through which a blade is moved between its operating and folded positions.

These and other objects and advantages of the invention will be evident or will be pointed out in connection with the following detailed description of one embodiment of the invention shown by way of example in the accompanying drawings.

Figure 1:
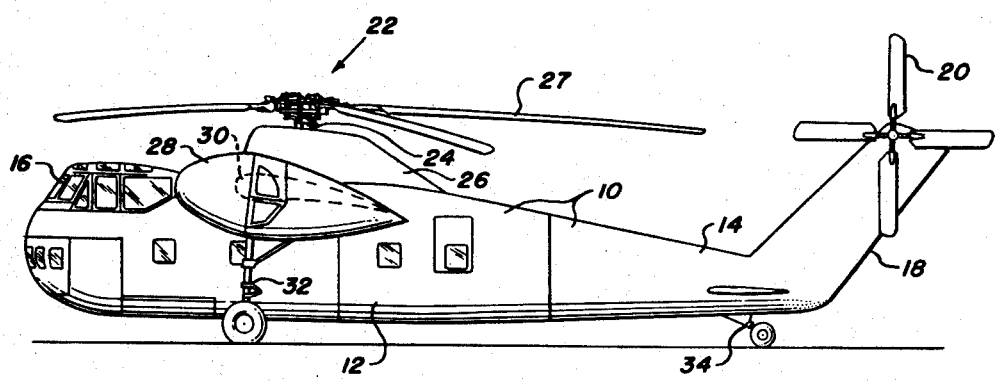
FIG. 1 is a side elevation of a helicopter embodying the invention.

Referring to these drawings in detail, FIG. 1 shows a helicopter having a fuselage 10 including a cargo or passenger compartment 12 which extends from the nose of the ship well aft into the tail cone 14 and a forward pilots' compartment 16 above the cargo compartment. A tail rotor pylon 18 is also provided having the usual anti-torque tail rotor 20 mounted thereon for rotation about a generally horizontal axis. A main sustaining rotor 22 is mounted on an upright tubular shaft 24 which extends from the main rotor pylon 26 located just aft of the pilots' compartment. As shown herein the main rotor has five blades 27 although the number of blades used may vary in different ships.

Two engines are provided to drive the main and tail rotors, each mounted in a separate nacelle 28, one of which is shown in FIG. 1. The nacelles are carried by stub wings 30 projecting laterally from opposite sides of the fuselage, one of which is shown in dotted lines in FIG. 1. The usual main and auxiliary landing gear 32 and 34 are provided for supporting the ship on the ground which may be retracted in flight in a well-known manner. An aircraft of this type is shown and described in my U.S. Patent No. 2,925,130 along with one means of blade folding.

Figure 3:
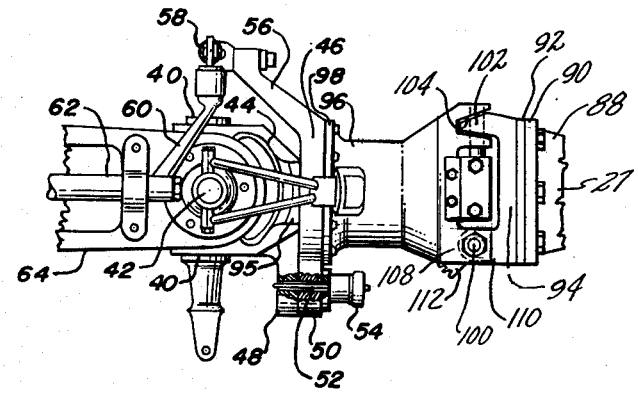
FIG. 3 is an enlarged detailed view of the rotor in the vicinity of the attaching means for one of the blades, showing the pivot about which the blade folds and the connection of the blade pitch control means to the blade root.
Figure 4:
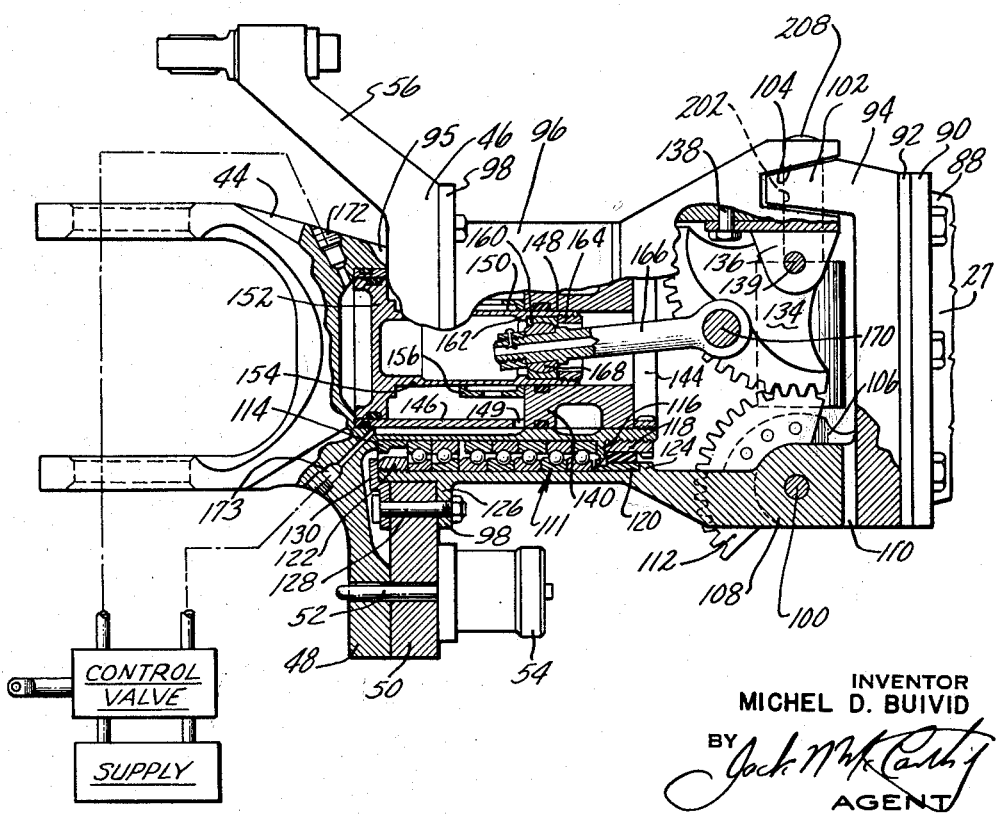
FIG. 4 is an enlarged detailed view of the flapping link as shown in FIG. 3.

The main sustaining rotor 22 consists of spaced upper and lower plates 36 and 38 (FIG. 2) carried by shaft 24 and between which the blades 27 are pivotally mounted for flapping movement about generally horizontal flapping hinges 40 (FIG. 3) and for movement in the plane of blade rotation about generally vertical drag hinges 42. Considering one of the five blades, it will be noted that in this rotor the axes of the drag hinge and the flapping hinge of the blade intersect each other. A flapping link 44 (FIG. 2) which carries the blade is pivoted on the flapping hinge. The flapping link has a spindle 95 (FIGS. 3 and 4) which extends axially of the blade and on which the blade is journaled for pitch changing movement.

The spindle 95 of the flapping link 44 is formed as a cylinder having a smooth external surface on which bearing means 111 are fixed to permit rotation of the blades for pitch changing movement. This bearing means will be hereinafter described.

A collar 46 at the inboard end of the blade folding hinge mechanism, to be hereinafter described, carries the usual blade horn 56, hereinafter referred to, for changing the pitch of the blade. The flapping link 44 and the collar 46 are provided with laterally projecting adjacent lugs 48 and 50, respectively, having aligned passages in which a locking pin 52 carried by lug 50 can be reciprocated to lock the blade against angular movement relative to the flapping link. A hydraulic system including a cylinder 54 carried by lug 50 controls the reciprocation of the pin 52, by a piston or diaphragm, into and out of locking position.

Figure 2:
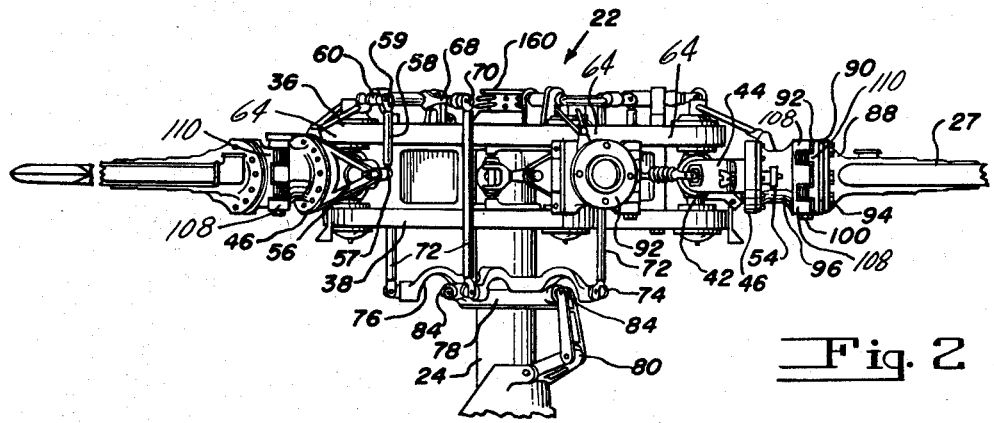
FIG. 2 is a side elevation of the main sustaining rotor of the helicopter of FIG. 1 with the blades broken away and parts omitted for purposes of illustration.

Horn 56 on collar 46 (FIG. 2) is connected for universal movement at 57 to the lower end of a rod 58, the upper end of which is connected by a clevis 59 to the rotatable lug extremity of an arm 60 fixed to a rocker shaft 62. A shaft 62 is journaled on each of the five blade supporting arms 64 of the plate 36 and has a second arm 68 pivotally connected at 70 to the upper end of a push-pull rod 72 (FIG. 2). The lower end of rod 72 is connected for universal movement at 74 to one lug of the rotatable portion 76 of a usual swash plate, the non-rotating portion 78 of which is prevented from rotation by a well-known scissors arrangement 80. The non-rotating swash plate portion 78 has four points 84, two of which are shown in FIG. 2. The right hand point 84 as viewed in this figure is attached to the scissors 80. The other three points 84 are connected to hydraulic servos, not shown. One of these servo connection points is shown in FIG. 2. Thus to fly forward the right front point 84 is lowered and to fly backward it is raised. To fly to the left the right rear point 84 is raised and to fly to the right it is lowered. When all three servos are actuated together the swash plate is moved bodily up or down on the shaft 24 to change the pitch of all the blades collectively. The servos as usual are controlled by the pilot by mechanism, not shown. Servos and controls mechanisms are shown in U.S. Patent No. 2,755,870 and application Serial No. 570,736, now Patent No. 2,957,527, for a Hydraulic Booster Control.

It will be noted that each blade has a cuff 88 which terminates in an inboard annular flange 90. Flange 90 is bolted to a similar flange 92 of a blade attaching member 94 forming one part of a two-part blade folding hinge mechanism. The other part 96, which is in the form of a sleeve, is journaled on the blade feathering spindle 95 and has an annular flange 98 which is bolted to collar 46. Parts 94 and 96 have hinge projections 108 and 110, respectively, on adjacent ends which are pivotally connected by a hinge pin 100 which is the pin about the axis of which the blade folds and unfolds. The outer end of each sleeve is built up on one side to provide for the hinge projections.

Part 96 has three hinge projections 108 extending therefrom on which the blade is to fold, and part 94 has two projections 110 which fit in the two spaces between the three projections 108, respectively, of the part 96. Part 94 has an arm 106 extending from each projection 110. Each arm 106 has a gear segment 112 fixed thereto, by bolts as shown, which extends between each of the two spaces between the three projections 108 of the part 96.

Each gear segment has as its center the axis of the hinge pin 100. Movement of the gear segments 112, therefore, pivots the blade attaching member 94 about pin 100, carrying with it the blade 27. Segment actuating means will be hereinafter described.

The other end of the sleeve of each part 96 is positioned over bearing means 111 and has a smooth internal surface which is fixed to the bearing means 111. The bearing means 111 comprises a stack of seven roller bearings having inner and outer races. The outer races of the bearing means are fixed to the internal surface of the sleeve of part 96 between a spacer member 120 and a spanner nut 122. The spacer member 120 abuts against an inwardly projecting flange 124 on the sleeve of the part 96. The inner races of the bearing means are fixed to the external surface of the spindle 95 between a spacer member 114 and a spacer member 116. The spacer member 114 abuts against a flange located at the base of the spindle 95, and the spacer member 116 is engaged by a spanner nut 118.

The sleeve of part 96 has an externally extending flange 126 which is fixed to a collar 46 which has been previously described. This flange 126 may be attached to the collar 46 by means of bolts 128. These bolts 128 can also support a locking means 130 for spanner nut 122.

Figure 6:
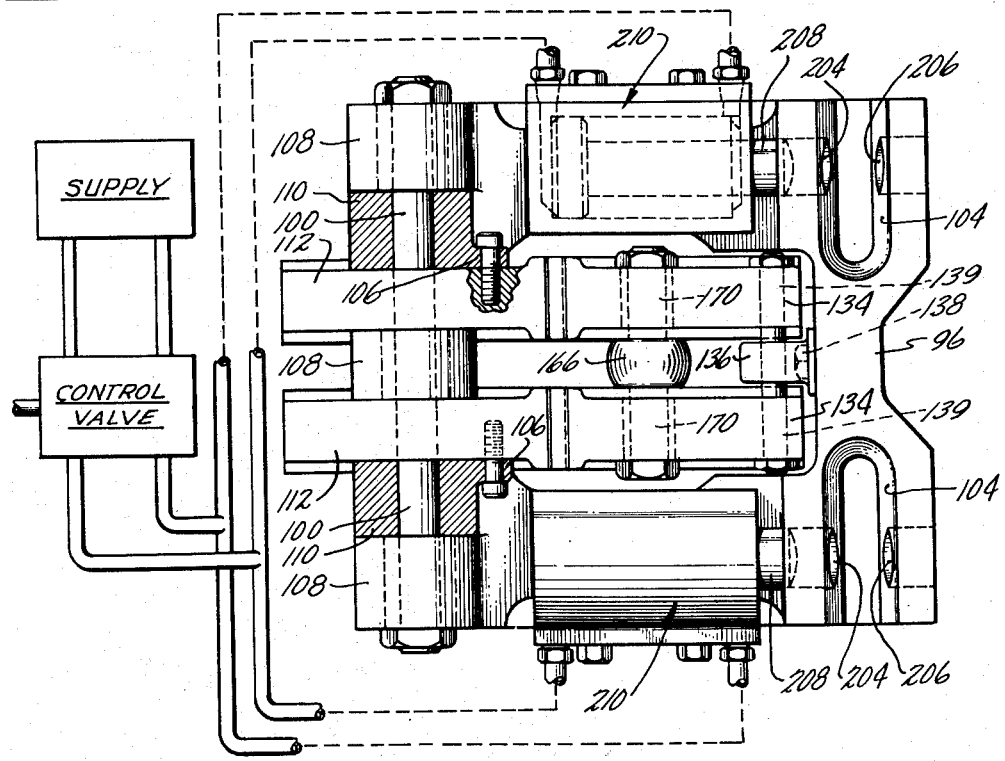
FIG. 6 is an end view of a sleeve mounted on a flapping link with the blade attaching member removed showing the location of the gear segments.

Hinge part 94 has two locking lugs 102 which enter into recesses 104 in the sleeve of part 96. The outer end of each sleeve is enlarged on one side to provide for the recesses 104. Each lug 102 has an opening 202 therethrough which aligns with openings 204 and 206 when each lug is in its cooperating recess 104. Blade locking pins 208 are reciprocable in openings 204, 202 and 206 to lock the blade in its flight, or unfolded, position or to unlock it so that the blade may be folded. Each pin is actuated by a cylinder and piston unit 210 which is fixed to the hinge part 96. One cylinder and piston unit is located at the top of the hinge part 96 while the other is located at the bottom. Each cylinder and piston unit 210 has two connections which connect respectively with each end of the cylinder. These connections are connected to a control valve and supply so that one or the other connection can be connected to an operating pressure while the remaining connection is connected to drain. It can be seen that when an operating pressure enters the cylinder and piston units from the left as viewed in FIG. 6, the pins 208 will be reciprocated so that they extend through openings 204 and 206, and then an operating pressure is connected so that it enters from the right of the cylinder and piston units, the pins 208 will be moved to the left and will be reciprocated so that they are out of contact entirely with opening 206 and do not extend across the recess 104.

The segment actuating means comprises (1) two gear segments 134 each having engagement with a gear segment 112; (2) a cylinder and piston arrangement; and (3) a hydraulic control means for directing fluid to one side or the other of the piston just referred to.

Each gear segment 134 is located in the same plane as its cooperating gear segment 112. These gear segments are fixed for rotation on a bracket 136 which extends inwardly from the inner wall of part 96. Bracket 136 is fixed to the wall by a bolt 138. A shaft 139 extends from each side of bracket 136 on which each respective gear segment rotates. It is to be noted that the bracket may be fixed by any means desirable.

Figure 5:
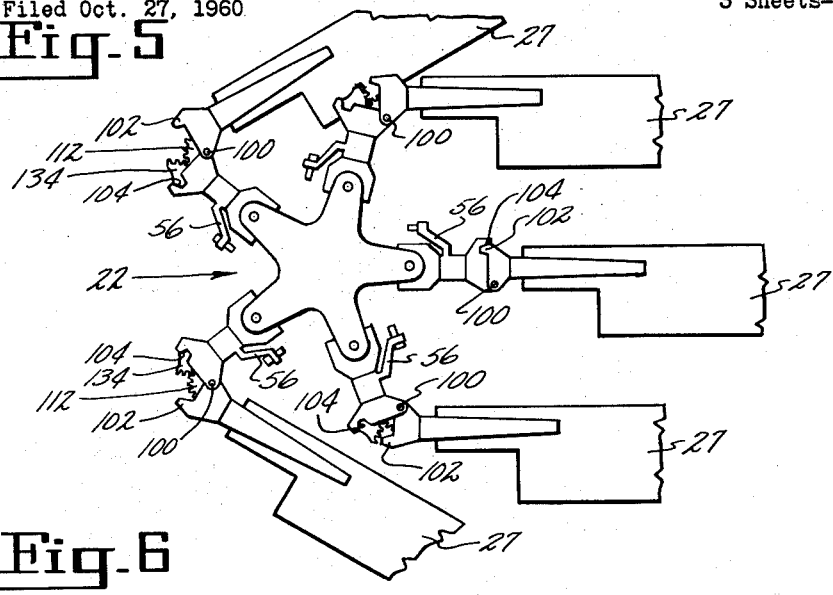
FIG. 5 is a simplified diagrammatic plan view of the rotor of FIG. 2 illustrating the way a five-blade rotor is folded in accordance with this invention, the blades being shown in the position they occupy just prior to a completion of the folding cycle.

Cylinder 140 is fixed within the hollow spindle 95 of the flapping link 44 between an annular abutment at the bottom of the hollow spindle 95, and an annular nut 144 secured to the inner end of the hollow cylindrical spindle. The cylinder 140 is formed having a bore 146 and a smaller bore 148. The hollow spindle 95 has a larger inner diameter than the outer diameter of the cylinder 140 for a distance between the annular abutment at the bottom of the hollow spindle and a point adjacent the end of the portion of the cylinder 140 housing the bore 148 which forms the bottom of the bore 146. An opening 149 is located in the wall of cylinder 140 connecting this recessed portion of the hollow spindle 95 and the inside of bore 146 of cylinder 140. This opening 149 is located adjacent the bottom surface formed inside of the cylinder where bore 148 starts. An opening 173 extends through the flapping link 44 to connect the recessed portion of the spindle 95 to the outer surface of the flapping link 44. An opening 172 connects the bottom of the hollow spindle 95 between the abutment and the bottom surface of the hollow spindle to the outer surface of the flapping link 44. A piston 150 has a portion 152 so dimensioned as to slideably engage bore 146, and it has a portion 154 which is dimensioned so as to slideably engage bore 148. A spacer member 156 properly limits the stroke of the piston. This spacer member is of a specific length depending on the position of the blade to be folded. In the event of a five bladed rotor, as viewed in FIG. 5, it can be seen that the two forward blades are rotated more than the next two so that a different stroke is needed. A control valve and supply is connected to openings 172 and 173 to operate as hereinafter described.

The portion 154 of the piston 150 is formed as a cylinder and has a ball socket member 160 fixed therein between an abutment 162 and a small annular nut 164. A piston rod 166 has a ball member 168 fixed on one end which is positioned in the socket of the ball socket member 160. The other end of piston rod 166 has an opening therethrough and surrounds a pin 170 which extends between the gear segments 134 at a point adjacent the teeth and midpoint of the segment. The ball and socket permit angular movement of the piston rod with respect to the piston and also permit rotation of the piston rod with respect to the piston. When the piston 150 reciprocates in its cylinder, the piston rod 166 pivots about the center of the ball and socket joint as the end of the piston rod 166 attached to the segments 134 moves through its path determined by the radius of the segment 134 and the degree of movement thereof. When the rotor and blades are in their operating position, the blade is free to change its pitch about the spindle 95. This means that a rotative connection has to be located between the blade and the hollow spindle 95 to permit relative rotation therebetween. During pitch movements the piston rod is free to rotate with respect to the spindle 95. This rotation is permitted in the ball and socket. Further, piston 150 is free to rotate in the cylinder.

To fold a blade, assuming it is in its operating position, the pins 52 are first placed in their extended position to fix lugs 48 and 50 together to lock the blade at a predetermined pitch angle. The pins 208 locking lugs 102 in the recesses 104 are then removed so that the blade may be pivoted about its hinge pin 100. It can now be seen that when opening 172 in the flapping link 44 is connected to an operating pressure, this pressure will come in contact with the outer face of the portion 152 of the piston 150 and move it to the right as viewed in FIG. 4. This action will in turn move the piston rod 166 and therefore rotate the gear segments 134 about the shaft 139. This movement of the gear segments 134 in turn rotates gear segments 112 and therefore pivots the blade 27 to a folded position. When opening 172 is connected to an operating pressure, opening 173 is connected to drain so that the fluid behind the piston will not act to lock it in position.

To unfold a blade and return it to its operating position, opening 173 is connected to an operating pressure, said pressure being directed to the inner face of the portion 152 of the piston 150 through opening 149. This action will move piston 150 to the left as viewed in FIG. 4, thereby moving the piston rod 166 in the same direction. This action will rotate the gear segments 134 about shaft 139, which movement will be transmitted to the gear segments 112 and therefore pivot the blade 27 to its operating position. When opening 173 is connected to an operating pressure, opening 172 is connected to drain. The blade locking pins 208 are then placed in the aligned apertures of the lugs 102 and recesses 104, as stated heretofore, to lock the blade in its flight or unfolded position. Pins 52 are then withdrawn so that the lugs 48 and 50 are no longer fixed together, thereby permitting pitch changes of the blade with respect to the flapping link.

I claim:

1. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, actuating means fixed to said blade for moving it about its pivot, and operating means positioned in said hollow arm for controlling said actuating means.

2. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, gear segment means fixed to said blade for moving it about its pivot, and operating means positioned in said hollow arm for controlling said gear segment means.

3. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, first gear segment means fixed to said blade for moving it about its pivot, and operating means positioned in said hollow arm for controlling said first gear segment means, said operating means including second gear segment means contacting said first gear segment means.

4. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, actuating means fixed to said blade for moving it about its pivot, and operating means positioned in said hollow arm for controlling said actuating means, said operating means including means permitting rotation of said blade with respect to said arm.

5. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, gear segment means fixed to said blade for moving it about its pivot, a cylinder and piston unit positioned in said hollow arm for controlling said gear segment means, and means connecting said piston to said gear segment means for rotating it about its axis.

6. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, first gear segment means fixed to said blade for moving it about its pivot, a cylinder and piston unit positioned in said hollow arm for controlling said first gear segment means, a second gear segment means pivotally mounted on an axis in said blade mounting means for relative movement therewith, said second gear segment means contacting said first gear segment means, and means connecting said piston to said second gear segment means for rotating it about its axis.

7. In a helicopter, a rotor, a blade, an arm extending from said rotor, said arm being hollow with an open outer end, a first member mounted on said arm for relative rotative movement therewith, said first member extending for a distance beyond the open outer end of said arm, said first member being hollow with an open outer end, a second member pivotally mounted to the free end of said first member, means for releasably holding said second member in fixed relation to said first member, means fixing said blade to said second member, a first gear segment fixed to said second member, a second gear segment pivotally mounted within said first hollow member, said two gear segments having engagement with each other, a cylinder in said hollow arm, a piston in said cylinder, and means connecting said piston to said second gear so as to rotate it about its axis.

8. In a helicopter, a rotor, a blade, an arm extending from said rotor, said arm being hollow with an open outer end, a first member mounted on said arm for relative rotative movement with said arm, said first member being hollow, said member extending for a distance beyond the open outer end of said arm, a second member pivotally mounted to the free end of said first member, means for releasably holding said second member in fixed relation to said first member, means fixing said blade to said second member, a first gear segment fixed to said second member, a second gear segment pivotally mounted to the inside of said first member, said two gear segments having engagement with each other, a cylinder in said hollow arm, a piston in said cylinder, and a piston rod connecting said piston to said second gear so as to rotate it about its axis, said piston rod having a universal joint connection with said piston which provides angular and rotative movement between said piston and rod.

9. In a helicopter, a rotor, a blade, an arm extending from said rotor, said arm being hollow with an open outer end, a first member mounted on said arm for relative rotative movement therewith, said first member being hollow, said member extending for a distance beyond the open outer end of said arm, a second member pivotally mounted to the free end of said first member, means for releasably holding said second member in fixed relation to said first member, means fixing said blade to said second member, a first gear segment fixed to said second member, a second gear segment pivotally mounted to the inside of said first member, said two gear segments having engagement with each other, a cylinder in said hollow arm, a piston in said cylinder, means connecting said piston to said second gear so as to rotate it about its axis, and means for diverting a fluid to one side of said piston or the other.

10. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, first actuating means fixed to said blade for moving it about its pivot, and operating means positioned between said hollow arm and said first actuating means for controlling said first actuating means, said operating means including a cylinder in said hollow arm, second actuating means mounted on said means mounting said blade to said arm, said second actuating means being connected to said first actuating means, a piston in said cylinder, and means connecting said piston to said second actuating means.

11. In a helicopter, a rotor, a blade, an arm projecting from said rotor for said blade, means mounting said blade on said arm, said arm being hollow with an open outer end, said means mounting said blade to said arm including a pivot for folding said blade with respect to said rotor, said means mounting said blade to said arm including a releasable holding means for fixedly positioning said blade with relation to said arm preventing movement about said pivot, first actuating means fixed to said blade for moving it about its pivot, and operating means positioned between said hollow arm and said first actuating means for controlling said first actuating means, said operating means including a cylinder in said hollow arm, second actuating means fixed to said means mounting said blade to said arm, said second actuating means being connected to said first actuating means, a piston in said cylinder, and a piston rod connecting said piston to said second actuating means.

12. In a helicopter, a rotor, a blade, an arm projecting from said rotor for said blade, means mounting said blade on said arm for relative rotative movement, said arm being hollow with an open outer end, said means mounting said blade to said arm including a pivot for folding said blade with respect to said rotor, said means mounting said blade to said arm including a releasable holding means for fixedly positioning said blade to said mounting means preventing movement about said pivot, first actuating means fixed to said blade for moving it about its pivot, and operating means positioned between said hollow arm and said first actuating means for controlling said first actuating means, said operating means including a cylinder in said hollow arm, second actuating means mounted on said means mounting said blade to said arm, said second actuating means being connected to said first actuating means, a piston in said cylinder, and a piston rod connecting said piston to said second actuating means, said piston rod having a universal joint connection with said piston which provides for angular and rotative movement between said piston and rod.

13. In a helicopter, a rotor, a plurality of blades, an arm projecting from said rotor for each blade, a blade mounting sleeve being rotatably mounted on each of said arms projecting from said rotor, some of said arms being hollow defining a bore with an open outer end, means connecting some of said blades to their cooperating blade mounting sleeves for folding movement about a folding axis, each connecting means including a releasable holding means for fixedly positioning its blade to its blade mounting sleeve, a sleeve fixed in each bore, a piston reciprocable in each sleeve, means for controlling movement of each piston, actuating means fixed to each blade, and connecting means universally journaled in each piston and connected to its associated actuating means for transferring movement of each piston to its actuating means for moving the connecting blade about its folding axis.

14. In a helicopter rotor mechanism having a rotary driving member, hinge means connected to said member having a blade support connected thereto, a blade extending outwardly from said support, a hollow member providing a connection between said blade and said support including a pair of joints connected to said blade, one of said joints being pivotal, separate means connecting said blade and said hollow member including a pair of movable elements, means for disconnecting the other of said joints, and power means in said hollow member operatively connected to said pair of elements for swinging said blade about the said pivotal joint to move said blade out of a normal flight position.

References Cited in the file of this patent

UNITED STATES PATENTS

| | | |
|---|---|---|
| 2,122,428 | Larsen | July 5, 1938 |
| 2,447,118 | Gluhareff | Aug. 17, 1948 |
| 2,500,382 | Rowley | Mar. 14, 1950 |
| 2,815,820 | Papadakos | Dec. 10, 1957 |
| 2,925,130 | Buivid | Feb. 16, 1960 |